United States Patent
Yule et al.

(10) Patent No.: US 7,233,282 B2
(45) Date of Patent: Jun. 19, 2007

(54) GPS RECEIVER WITH ENCRYPTED DATA TRANSMISSION

(75) Inventors: Andrew T. Yule, East Grinstead (GB); Christopher B. Marshall, Haywards Heath (GB)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 10/540,317

(22) PCT Filed: Dec. 11, 2003

(86) PCT No.: PCT/IB03/06043

§ 371 (c)(1),
(2), (4) Date: Jun. 21, 2005

(87) PCT Pub. No.: WO2004/059337

PCT Pub. Date: Jul. 15, 2004

(65) Prior Publication Data

US 2006/0071850 A1    Apr. 6, 2006

(30) Foreign Application Priority Data

Dec. 24, 2002  (GB)  ................................ 0230133.1

(51) Int. Cl.
*G01S 1/00* (2006.01)
(52) U.S. Cl. .............................. 342/357.12; 342/357.06
(58) Field of Classification Search ........... 342/357.01, 342/357.06, 357.12; 701/207, 213, 215
See application file for complete search history.

(56) References Cited

U.S. PATENT DOCUMENTS 6,317,500 B1 * 11/2001 Murphy ...................... 380/258
2002/0136407 A1 * 9/2002 Denning et al. ............ 380/258
2003/0108202 A1 * 6/2003 Clapper ...................... 380/258
2003/0195808 A1 * 10/2003 Brown et al. ................. 705/14
2004/0190715 A1 * 9/2004 Nimura et al. ................ 380/44

FOREIGN PATENT DOCUMENTS

EP    0 508 405 A1    10/1992
EP    1 241 553 A1    9/2002

OTHER PUBLICATIONS

"A Direct RF Sampling Multifrequency GPS Receiver", by Thor et al., IEEE 2002.
"Real-time Software Radio Architectures for GPS Receivers", by Akos et al., GPS World, Jul. 2001.

* cited by examiner

*Primary Examiner*—Dao L. Phan

(57) ABSTRACT

A GPS receiver device is disclosed comprising a GPS antenna and a GPS RF front-end including an analogue to digital converter for receiving GPS signals and outputting GPS signal samples; and a processor for encrypting the GPS signal samples and transmitting the encrypted GPS signal samples to an external device. Also disclosed is a corresponding method of providing a position fix comprising the steps of connecting to a GPS receiver device and receiving encrypted GPS signal samples therefrom, decrypting the encrypted GPS signal samples and processing the decrypted GPS signal samples to determine a position fix; and a computer program, computer-readable storage medium and apparatus for the same.

6 Claims, 1 Drawing Sheet

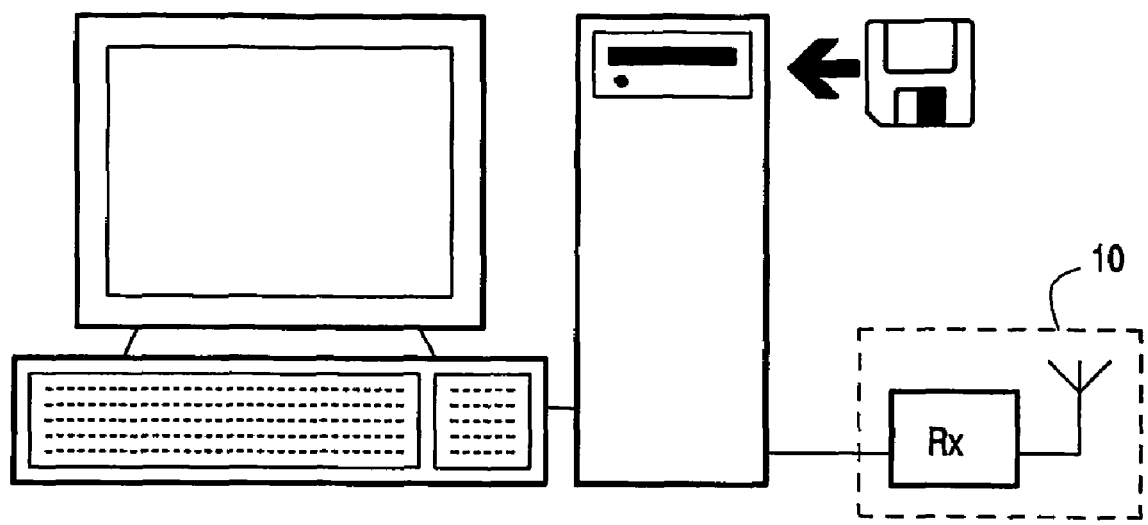

GPS RECEIVER WITH ENCRYPTED DATA TRANSMISSION

The present invention claims the benefit of the earlier filing date, pursuant to 35 USC 119, to that International Patent Application filed under the provisions of the Patent Cooperation Treat on Dec. 11, 2003, and afforded Serial No. IB2003/006043, which further claims the benefit of the earlier filing date of that patent application filed in the Patent Office of Great Britain on Dec. 24, 2002 and afforded Serial No. 0230133.1, the contents of both of which are incorporated by reference herein.

The present invention relates to a GPS receiver device comprising a GPS antenna and a GPS RF front-end including an analogue to digital converter for receiving GPS signals and outputting GPS signal samples; and a processor for transmitting the received GPS signal samples to an external device.

The present invention further relates to a corresponding method of providing a position fix comprising the steps of connecting to such a GPS receiver device, receiving GPS signal samples therefrom and processing the GPS signal samples to determine a position fix; and to a computer program, computer-readable storage medium and apparatus for the same.

Article "Real-time software radio architectures for GPS receivers" by Akos et al. (GPS World, July 2001) discloses GPS software receivers in which the GPS signal processing is accomplished by means of a programmable micro-processor or digital signal processor as opposed to analogue or discrete hardwires components. As illustrated in FIG. 2 of this article, a simplified "GPS software receiver" is provided consisting of a GPS antenna and GPS RF front-end section for GPS signal pre-processing (including filtering, amplification and frequency down-conversion) and analogue to digital conversion. The GPS signal samples outputted from the GPS RF front-end section can be fed in to a modern PC running appropriate GPS signal processing software to determine a position fix. The authors of this article have contemplated the GPS software receiver in the form a "plug-in" module, i.e. a "dongle" type device, which because of its simple architecture could be manufactured cheaply, thereby facilitating widespread adoption. Of course, the GPS signal processing software which would reside on the PC is inherently cheap to replicate.

In accordance with the present invention, there is provided a GPS receiver device of the aforementioned type in which the processor first encrypts the GPS signal samples and then transmits the encrypted GPS signal samples to an external device.

Also provided in accordance with the present invention is a corresponding method of providing a position fix of the aforementioned type in which encrypted GPS signal samples are received and decrypted, and the decrypted GPS signal samples to determine a position fix; and a computer program, computer-readable storage medium and apparatus for the same.

The inventors have realised that there is a disadvantage with conventional GPS receiver devices of the plug-in type described in the aforementioned Akos article. Once such a GPS receiver device has become widely disseminated and the data format in which the GPS receiver device provides the GPS signal samples known, a user is free to employ alternative GPS signal processing software to determine a position fix and not necessarily that of or authorised by the provider of the GPS receiver device. This hinders the commercial prospects of a provider of such GPS receiver devices distributing those devices at or below cost to obtain ubiquity in anticipation of generating revenue through use of their particular GPS signal processing software, e.g. by licensing fees or by providing location based services. Encryption ensures that such a GPS receiver device could only be used with authorised GPS signal processing software which is able to decrypt the GPS signals samples to determine a position fix.

The present invention will now be described, by way of example only, with reference to the accompanying FIGURE which shows, schematically, a PC connected to a GPS receiver device, both operating in accordance with the present invention.

Referring to the accompanying FIG. 1 the PC is connected via a USB PC port and corresponding cable to the GPS receiver device 10 which consists of a GPS RF front-end section Rx and a GPS antenna. Whilst the device could have been a "dongle" type device thereby omitting the cable, the cable facilitates positioning of the GPS receiver device (including the antenna) in a prominent position, thereby increasing the chances of acquiring GPS signals. For example, one might place the GPS receiver device near a window if operating in doors.

When operative, the GPS receiver device receives NAVSTAR SPS GPS signals through its antenna and pre-process them, typically by passive bandpass filtering in order to minimise out-of-band RF interference, preamplification, down conversion to an intermediate frequency (IF) and analogue to digital conversion. The resultant GPS signal samples contain the IF signal which remains modulated, still containing all the information from the available satellites.

In accordance with the present invention, the GPS signal samples are first encrypted and then outputted from the GPS receiver device via the USB link into PC memory (not shown).

Using appropriate PC based decryption and GPS signal processing software, the GPS signal samples are first decrypted and then processed so that GPS signals may acquired for the purpose of deriving pseudorange information from which the position of the PC can be determined using conventional navigation algorithms. Such GPS signal acquisition and pseudorange processing is well known, for example, see GPS Principles and Applications (Editor, Kaplan) ISBN 0-89006-793-7 Artech House.

Suitable types of encryption would suggest themselves to a skilled person in that art but for the avoidance of doubt, by encryption, it is meant that GPS signal samples values are scrambled and/or changed by the encryption and not merely that a GPS signal sample block is incorporated unscrambled or unchanged in a proprietary file or data stream format.

For example, a very simple encryption method would be XORing the samples with a sequence generated by a shift register, starting in a known state each time. An appropriate 32-bit shift register would generate a sequence (2 32)–1 samples long (i.e. ~4000 million samples). This method could be further enhanced by a different starting state each time; the PC software could indicate a random starting state to the dongle at PC boot up. It is also worth noting that as the GPS samples contain signals which are very close to white noise, cracking the encryption without inside knowledge ought to be very difficult.

Also, whilst the present invention has been illustrated in the context of a PC, it is of course equally applicable to other apparatus able to support decryption and GPS signal processing software, and to which a GPS receiver device according to the present invention can be connected. For example, the invention may be employed with mobile devices such as laptop PCs, PDAs and telephone; or generally stationary objects such as a TVs or TV set-top boxes.

Finally, whilst the invention has been described in the context of NAVSTAR GPS, the all weather, spaced based navigation system developed and currently operated by the US Department of Defense, it will be appreciated that the invention is equally applicable to other global positioning systems including GLONASS and Galileo and hybrids thereof.

The invention claimed is:

1. A method, operable in a computing system, of providing a position fix comprising the steps of:
    connecting to a GPS receiver device;
    receiving encrypted GPS signal samples therefrom, wherein the GPS receiver device is provided a variable encrypted key for encrypting received GPS data;
    decrypting the encrypted GPS signal samples using a decryption key comparable to the encryption key; and
    processing the decrypted GPS signal samples to determine a position fix.

2. A computer program comprising instructions for performing the method of claim 1.

3. A computer-readable storage medium having recorded thereon data containing instructions for performing a method according to claim 1.

4. Apparatus configured to perform a method according to claim 1.

5. The method as recited in claim 2, wherein the encryption key is provided by an external device.

6. The method as recited in claim 1, wherein the encryption key is determined for each initiation of the computing system.

* * * * *